(12) United States Patent
Liang et al.

(10) Patent No.: US 10,823,901 B2
(45) Date of Patent: Nov. 3, 2020

(54) DISPLAY DEVICE AND METHODS FOR FORMING THE SAME

(71) Applicant: InnoLux Corporation, Miao-Li County (TW)

(72) Inventors: I-Chang Liang, Miao-Li County (TW); I-Jung Lin, Miao-Li County (TW); Yuan-Jen Cheng, Miao-Li County (TW); Tsu-Hsien Ku, Miao-Li County (TW); Ying-Yao Tang, Miao-Li County (TW); Fang-Cheng Jhou, Miao-Li County (TW); Li-Chi Luo, Miao-Li County (TW); Ruei-Ting Huang, Miao-Li County (TW); Chia-Wei Lai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/674,274

(22) Filed: Nov. 5, 2019

(65) Prior Publication Data
US 2020/0073045 A1 Mar. 5, 2020

Related U.S. Application Data

(62) Division of application No. 15/785,472, filed on Oct. 17, 2017, now Pat. No. 10,502,887.

(Continued)

(30) Foreign Application Priority Data

Jul. 11, 2017 (CN) .......................... 2017 1 0560702

(51) Int. Cl.
*G02F 1/1335* (2006.01)
*F21V 8/00* (2006.01)
(Continued)

(52) U.S. Cl.
CPC .............. *G02B 6/0056* (2013.01); *G02B 1/11* (2013.01); *G02B 1/14* (2015.01); *G02B 5/30* (2013.01);
(Continued)

(58) Field of Classification Search
CPC ................... G02F 2001/133331; G02B 6/0056
See application file for complete search history.

(56) References Cited

U.S. PATENT DOCUMENTS

2007/0046873 A1* 3/2007 Sakurai ................. G02F 1/1333
349/122

FOREIGN PATENT DOCUMENTS

CN 104777925 A 7/2015

OTHER PUBLICATIONS

Chinese language office action dated May 27, 2020, issued in application No. CN 201710560702.9.

* cited by examiner

*Primary Examiner* — James A Dudek
(74) *Attorney, Agent, or Firm* — McClure, Qualey & Rodack, LLP

(57) ABSTRACT

A display device having a display region and a peripheral region surrounding the display region is provided. The display device includes a first adhesion layer sandwiched between a display unit and a protective structure. The protective structure includes a first protective layer having a first length in a first direction. The protective structure also includes a second adhesion layer disposed on the first protective layer. The protective structure further includes a second protective layer disposed on the second adhesion layer, and the second protective layer has a second length in the first direction, wherein the difference between the first length and the second length is between 0 and 1 mm, and (Continued)

wherein the second protective layer is on the outermost side of the display device.

15 Claims, 16 Drawing Sheets

Related U.S. Application Data

(60) Provisional application No. 62/449,605, filed on Jan. 24, 2017, provisional application No. 62/416,679, filed on Nov. 2, 2016.

(51) Int. Cl.
*G02B 1/11* (2015.01)
*G02F 1/13357* (2006.01)
*G02B 5/30* (2006.01)
*G02B 1/14* (2015.01)
*G02F 1/1333* (2006.01)

(52) U.S. Cl.
CPC ...... *G02F 1/1335* (2013.01); *G02F 1/133615* (2013.01); *G02F 2001/133331* (2013.01); *G02F 2201/50* (2013.01); *G02F 2201/503* (2013.01); *G02F 2202/28* (2013.01)

DISPLAY DEVICE AND METHODS FOR FORMING THE SAME

CROSS REFERENCE TO RELATED APPLICATIONS

This application is a Divisional of U.S. patent application Ser. No. 15/785,472, filed on Oct. 17, 2017, now U.S. Pat. No. 10,502,887, which claims priority of China Patent Application No. 201710560702.9 filed on Jul. 11, 2017, which claims the benefit of priority from a provisional application of U.S. Patent Application No. 62/416,679 filed on Nov. 2, 2016 and a provisional application of U.S. Patent Application No. 62/449,605 filed on Jan. 24, 2017, the entirety of which is incorporated by reference herein.

BACKGROUND OF THE INVENTION

Field of the Invention

The embodiments of the disclosure relate to a display device, and in particular to a display device with a protective structure having a flat side surface.

Description of the Related Art

As digital technology develops, display devices are becoming more widely used in society. For example, display devices have been applied to modern information and communication devices such as televisions, notebooks, computers, mobile phones and smartphones. In addition, each generation of display devices has been developed to be thinner, lighter, smaller, and more fashionable than the last.

Curved structures have been widely used in household appliances, communication devices, and electronic information devices. Currently, curved structures can be combined with a touch panel and a display panel for use as a touch display device, which allows users to directly select images shown on the panel using a finger or a touch pen. Therefore, touch display devices can provide an efficient operation system, gradually replacing physical keyboards as the input interface of choice in various electronic products.

Methods for forming a curved glass having a decorative layer in a conventional curved structure generally include a printing process after a bending process. However, in the processes of printing after bending, since the curved glass has a complex appearance, the subsequent printing process (and other processing) is hard to perform. Therefore, conventional curved structures have the problem of having a lower quality of appearance uniformity. Thus, conventional curved structures still have a bottleneck to break through.

BRIEF SUMMARY OF THE INVENTION

The present disclosure provides a display device having a display region and a peripheral region surrounding the display region. The display device includes a first adhesion layer sandwiched between a display unit and a protective structure. The protective structure includes a first protective layer having a first length in a first direction. The protective structure also includes a second adhesion layer disposed on the first protective layer. The protective structure further includes a second protective layer disposed on the second adhesion layer, and the second protective layer has a second length in the first direction, wherein the difference between the first length and the second length is between 0 and 1 mm, and wherein the second protective layer is on the outermost side of the display device.

The present disclosure provides a method for forming a display device. The method includes forming a display unit and a protective structure. The method also includes attaching the protective structure to the display unit through a first adhesion layer, wherein forming the protective structure includes: attaching a first protective layer adjacent to the display unit to a second protective layer through a second adhesion layer, wherein the first protective layer has a first length in a first direction, the second protective layer has a second length in the first direction, and the difference between the first length and the second length is between 0 and 1 mm.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION OF THE INVENTION

Figure 1:
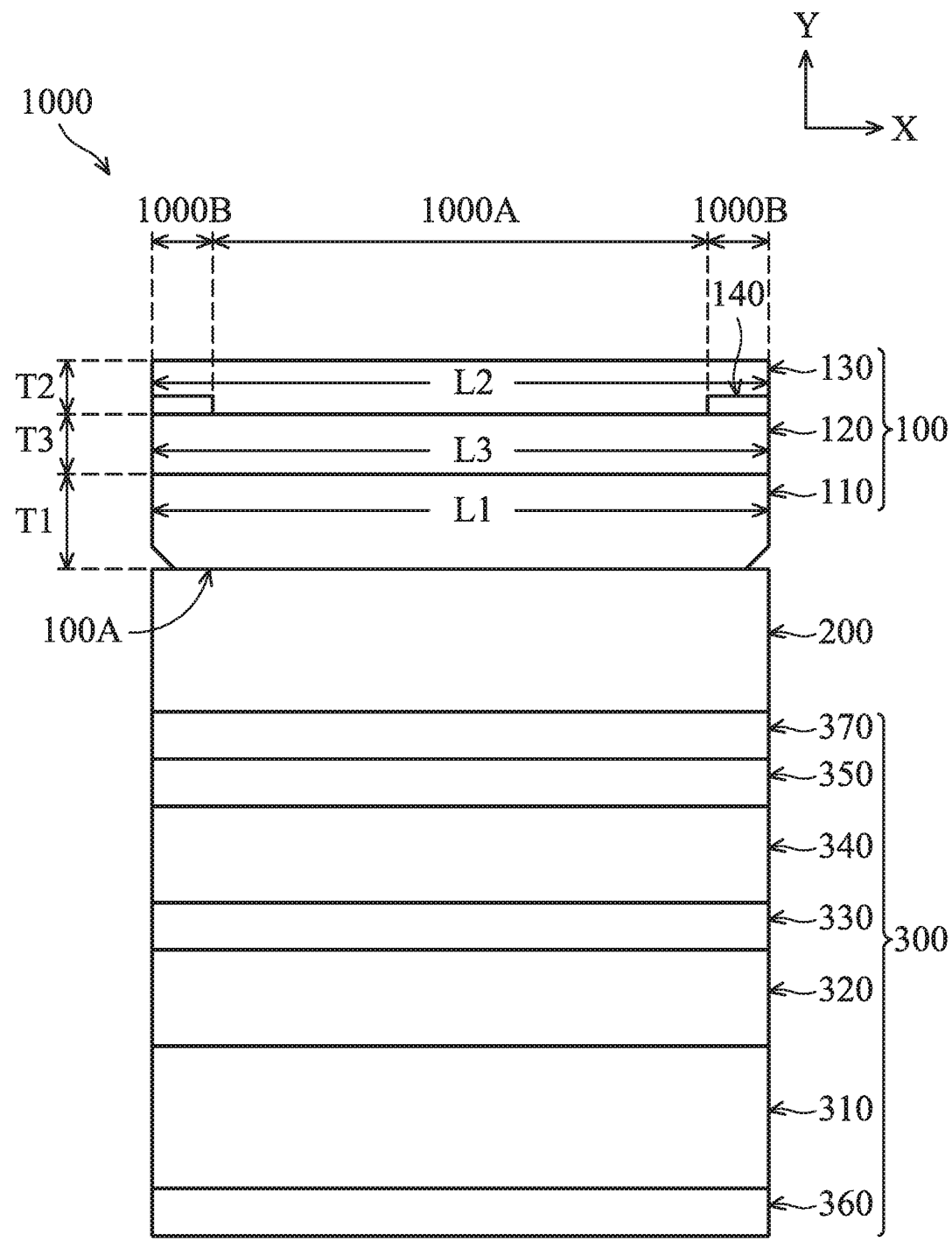
FIG. 1 is a cross-sectional view of a display device in accordance with some embodiments of the present disclosure.

The display device of the present disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first material layer disposed on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate that the layer is in direct contact with the other layer, or that the layer is not in direct contact with the other layer, there being one or more intermediate layers disposed between the layer and the other layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

The terms "about" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another region, layer or section. Thus, a first element, component, region, layer, portion or section discussed below could be termed a second element, component, region, layer, portion or section without departing from the teachings of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

This description of the exemplary embodiments is intended to be read in connection with the accompanying drawings, which are to be considered part of the entire written description. The drawings are not drawn to scale. In addition, structures and devices are shown schematically in order to simplify the drawing.

In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

The term "substrate" is meant to include devices formed within a transparent substrate and the layers overlying the transparent substrate. All transistor element needed may be already formed over the substrate. However, the substrate is represented with a flat surface in order to simplify the drawing. The term "substrate surface" is meant to include the uppermost exposed layers on a transparent substrate, such as an insulating layer and/or metallurgy lines.

The thickness of a structure described in the embodiments of the disclosure indicates a value for the average thickness of the structure after deleting outliers. The outliers can be the thickness of an edge, an obvious micro-trench, or an obvious micro-raised area. After deleting the outliers, most values of the thickness are within a range of plus or minus three standard deviations.

Refer to FIG. 1, which is a cross-sectional view of a display device 1000 in accordance with some embodiments of the present disclosure. As shown in FIG. 1, the display device 1000 has a display region 1000A and a peripheral region 1000B. In addition, in some embodiments, the display device 1000 includes a protective structure 100, a first adhesion layer 200 and a display unit 300, wherein the first adhesion layer 200 is disposed between the protective structure 100 and the display unit 300.

As shown in FIG. 1, the protective structure 100 is on the outermost side of the display device 1000. In some embodiments, the protective structure 100 includes a first protective layer 110, a second adhesion layer 120 and a second protective layer 130. The first protective layer 110 is adjacent to the first adhesion layer 200. The material of the first protective layer 110 includes, but is not limited to, glass, poly(methyl methacrylate) (PMMA), polycarbonate (PC) and other applicable materials. The first protective layer 110 has a first surface 100A adjacent to the display unit 300. As shown in FIG. 1, the first protective layer 110 has a first length L1 in a first direction (e.g. X direction, which is parallel to the first surface 100A in a cross-section of the protective structure 100) and a first thickness T1 in a second direction (e.g. Y direction, which is a direction along the stacking direction of the first protective layer 110, the second adhesion layer 120 and the second protective layer 130). In some embodiments, the first thickness T1 is between 1 mm-3 mm. In addition, the first protective layer 110 is plastic (or flexible) so that the first protective layer 110 can be used in a display device having the curved structure. When there is a requirement for the first protective layer 110 to be strengthened and the first protective layer 110 is glass, that is capable of being chemically strengthened, the first protective layer 110 may be soaked in a chemical solution such as potassium nitrate to perform ion exchange to form a chemical-strengthening layer (not shown) on the surface of the first protective layer 110 before the first protective layer 110 and the second protective layer 130 are attached together.

As shown in FIG. 1, the second protective layer 130 is disposed on the second adhesion layer 120, and is in the outermost layer of the protective structure 100. In some embodiments, the second protective layer 130 includes, but is not limited to, alkali-free glass, alkali-containing glass or chemical-strengthening glass. As shown in FIG. 1, the second protective layer 130 has a second length L2 in the first direction and a second thickness T2 in the second direction. In some embodiments, the second thickness T2 is smaller than or equivalent to the 0.4 mm. In addition, the second protective layer 130 is also plastic so that second protective layer 130 can be used in a display device having the curved structure. In some embodiments, when there is a requirement for the second protective layer 130 to be strengthened and the second protective layer 130 is glass, that is capable of being chemically strengthened, the second protective layer 130 may be soaked in a chemical solution such as potassium nitrate to perform ion exchange to form a chemical-strengthening layer (not shown) on the surface of the second protective layer 130 before the second protective layer 130 and the first protective layer 110 are attached together.

The second adhesion layer 120 is disposed between the first protective layer 110 and the second protective layer 130 for attaching both the first protective layer 110 and the second protective layer 130. The material of the second adhesion layer 120 may include, but is not limited to, optical clear adhesive (OCA), optical clear resin (OCR) or other suitable transparent materials. As shown in FIG. 3, the second adhesion layer 120 has a third length L3 in the first direction and a third thickness T3 in the second direction. In some embodiments, the third thickness T3 is between 100 µm and 800 µm.

As shown in FIG. 1, the protective structure 100 further includes a light-shielding layer 140. The light-shielding layer 140 is disposed on the second adhesion layer 120 and in the second protective layer 130. In addition, the light-shielding layer 140 is disposed in the peripheral region 1000B of the protective structure 100 to shield the elements or region which is not used to display colors in the display device 1000. In some embodiment, the light-shielding layer 140 may be constituted of a single layer, multiple layers or in a composite way of using photo-curable ink, thermal-curable ink, or another light-shielding material, but it is not limited thereto. The color of the light-shielding layer 140 may be any color that does not make light transmission easy, such as white, black, grey, red, green, blue, gold, silver, another suitable color, or a combination thereof, but it is not limited thereto. Moreover, the light-shielding layer 140 may be formed by using screen printing, inkjet printing, transfer printing or other suitable methods.

In some embodiments, the first length L1 is substantially equivalent to the second length L2 and the third length L3. In some embodiments, the difference between the first length L1 and the second length L2 is between the 0 and 1 mm.

Moreover, in some embodiments, as shown in FIG. 1, the display unit 300 includes a first substrate 310, a liquid-crystal layer 320 disposed on the first substrate 310, a light filter film 330 disposed on the liquid-crystal layer 320 and a second substrate 340 disposed on the light filter film 330. In addition, the display unit 300 also includes a first polarizing film 350 disposed on the second substrate 340 and a second polarizing film 360 disposed on a surface far from the first polarizing film 350 of the first substrate 310. In some embodiments, the display unit 300 further includes a sensing electrode layer 370 disposed above the first polarizing film 350. By formation of the sensing electrode layer 370, the display device 1000 can be used as a touch panel. The formation of the sensing electrode layer 370 is optional: in other embodiments, the display unit 300 does not include the sensing electrode layer 370.

The first substrate 310 may include a transparent substrate such as a glass substrate, a ceramic substrate, a plastic substrate or another applicable substrate. The first substrate 310 also may include phosphosilicate glass (PSG), boro-phosphosilicate glass (BPSG), silicon oxide, silicon nitride, silicon oxynitride, high-k material, any other applicable dielectric material, and a combinations thereof. The high-k material refers to a material with a high dielectric constant and it may include, but is not limited to, metal oxide, metal nitride, metal silicide, transition metal oxide, transition metal nitride, transition metal silicide, transition metal oxynitride, metal aluminate, zirconium silicate, and zirconium aluminate. For example, the material of the high-k material may include, but is not limited to, LaO, AlO, ZrO, TiO, $Ta_2O_5$, $Y_2O_3$, $SrTiO_3$(STO), $BaTiO_3$(BTO), BaZrO, $HfO_2$, $HfO_3$, HfZrO, HfLaO, HfSiO, HfSiON, LaSiO, AlSiO, HfTaO, HfTiO, HfTaTiO, HfAlON, $(Ba,Sr)TiO_3$ (BST), $Al_2O_3$, any other applicable high-k dielectric material, and combinations thereof.

In addition, the first substrate 310 at least includes a light-emitting diode (not shown) used as a radiant source of the display unit 300. The first substrate 310 also includes an integrated circuit (not shown) electrically connected to the light-emitting diode. The integrated circuit (IC) may include, but is not limited to, a micro-processor, a memory element and/or other elements. The IC may also include various passive and active microelectronic devices, such as thin film resistors, other capacitors (e.g., metal-insulator-metal capacitor, MIMCAP), inductors, diodes, metal-oxide-semiconductor field effect transistors (MOSFETs), complementary MOS (CMOS) transistors, bipolar junction transistors (BJTs), laterally diffused MOS (LDMOS) transistors, high power MOS transistors, or other types of transistors.

The liquid-crystal layer 320 is disposed over the first substrate 310. The liquid-crystal layer 320 utilizes the properties of liquid-crystal molecules, which have different polarization or reflection effects to lights under different arrangement states, so as to control the amounts of the transmitting lights, and thus creates images. The liquid-crystal layer 320 may include, but is not limited to, a twisted nematic (TN) liquid-crystal, a super twisted nematic (STN) liquid-crystal, a double layer super twisted nematic (DSTN) liquid-crystal, a vertical alignment (VA) liquid-crystal, an in-plane switching (IPS) liquid-crystal, a cholesteric liquid-crystal, a blue phase liquid-crystal, a fringe-field switching (FFS) liquid-crystal, or any other suitable liquid-crystal.

The light filter film 330 is disposed on the liquid-crystal layer 320. The light filter film 330 may include, but is not limited to, a blue light filter, a red light filter, a green light filter or other suitable color filters.

As shown in FIG. 1, the second substrate 340 is disposed on the light filter film 330. The second substrate 340 may include a transparent substrate such as a glass substrate, a ceramic substrate, a plastic substrate or another applicable substrate. The second substrate 340 also may include PSG, BPSG, silicon oxide, silicon nitride, silicon oxynitride, high-k material, any other applicable dielectric material, and combinations thereof. The high-k material refers to a material with a high dielectric constant and it may include, but is not limited to, metal oxide, metal nitride, metal silicide, transition metal oxide, transition metal nitride, transition metal silicide, transition metal oxynitride, metal aluminate, zirconium silicate, and zirconium aluminate. For example, the material of the high-k material may include, but is not limited to, LaO, AlO, ZrO, TiO, $Ta_2O_5$, $Y_2O_3$, $SrTiO_3$(STO), $BaTiO_3$(BTO), BaZrO, $HfO_2$, $HfO_3$, HfZrO, HfLaO, HfSiO, HfSiON, LaSiO, AlSiO, HfTaO, HfSiO, HfTaTiO, HfAlON, (Ba,Sr)$TiO_3$(BST), $Al_2O_3$, any other applicable high-k dielectric material, and combinations thereof.

As shown in FIG. 1, the first polarizing film 350 is disposed over the second substrate 340, and the second polarizing film 360 is disposed on the surface far from the first polarizing film 350 of the first substrate 310. The first polarizing film 350 and the second polarizing film 360 can convert the natural light into linearly polarized light. The component of the polarized light is separated, and a part of it passes through, while the other part is blocked by absorption, reflection and scattering by the first polarizing film 350 and the second polarizing film 360. The first polarizing film 350 and the second polarizing film 360 may include polyvinyl alcohol or other materials, and are not limited thereto.

In some embodiments, as shown in FIG. 1, the display unit 300 may include the sensing electrode layer 370 disposed over the first polarizing film 350. The material of the sensing electrode layer 370 may include a metal, other transparent conductive material or other non-transparent conductive material such as a metal mesh, a carbon nanotube, a silver nanowire or a graphene. The transparent conductive material may include, but is not limited to, metal oxide such as indium tin oxide (ITO), tin oxide (SnO), indium zinc oxide (IZO), indium gallium zinc oxide (IGZO), indium tin zinc oxide (ITZO), antimony tin oxide (ATO), antimony zinc oxide (AZO), a combination thereof, or any other suitable transparent conductive oxide. In addition, the driving mode of the sensing electrode layer 370 is self-capacitive type, and is not limited thereto.

As shown in FIG. 1, the first adhesion layer 200 is disposed between the protective structure 100 and the display unit 300 for attaching the protective structure 100 to the display unit 300. The material of the second adhesion layer 120 may include, but is not limited to, OCA, OCR or other suitable transparent materials.

Next, refer to FIGS. 2A-2E, which are cross-sectional views of various stages of a process for forming the protective structure 100 in accordance with some embodiments of the present disclosure. More specifically, FIGS. 2A-2E illustrate that the formation of the protective structure 100 which has a first protective layer 110 and a second protective layer 130 of the same length.

Figure 2A:
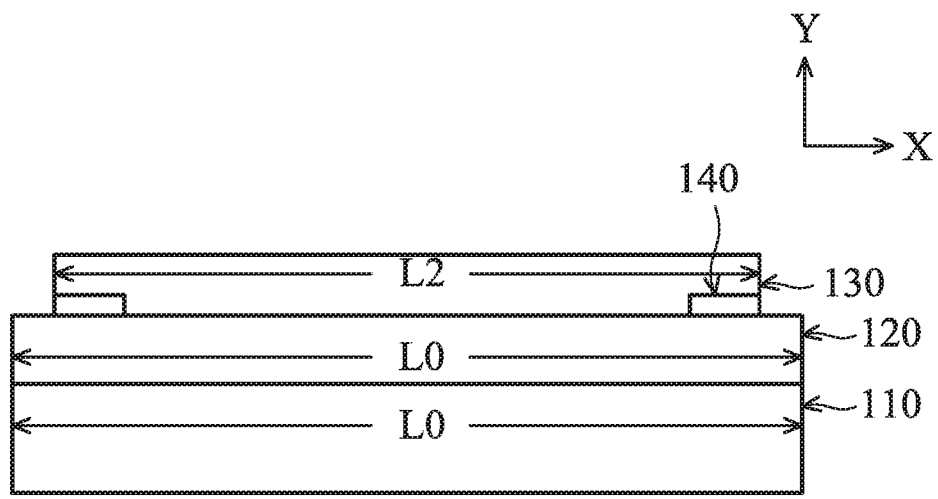
FIGS. 2A-2E are cross-sectional views of various stages of a process for forming a protective structure in accordance with some embodiments of the present disclosure.

At first, as shown in FIG. 2A, the first protective layer 110, the second adhesion layer 120 and the second protective layer 130 are provided. The first protective layer 110 has an original length L0 in the first direction, the second protective layer 130 has the second length L2 in the first direction, and the second adhesion layer 120 has the original length L0 in the first direction which is the same as that of the first protective layer 110. As shown in FIG. 2A, the original length L0 of the first protective layer 110 and the second adhesion layer 120 is greater than the second length L2 of the second protective layer 130. In addition, the light-shielding layer 140 is formed in the second protective layer 130 and located in the peripheral of the second protective layer 130.

Figure 2B:
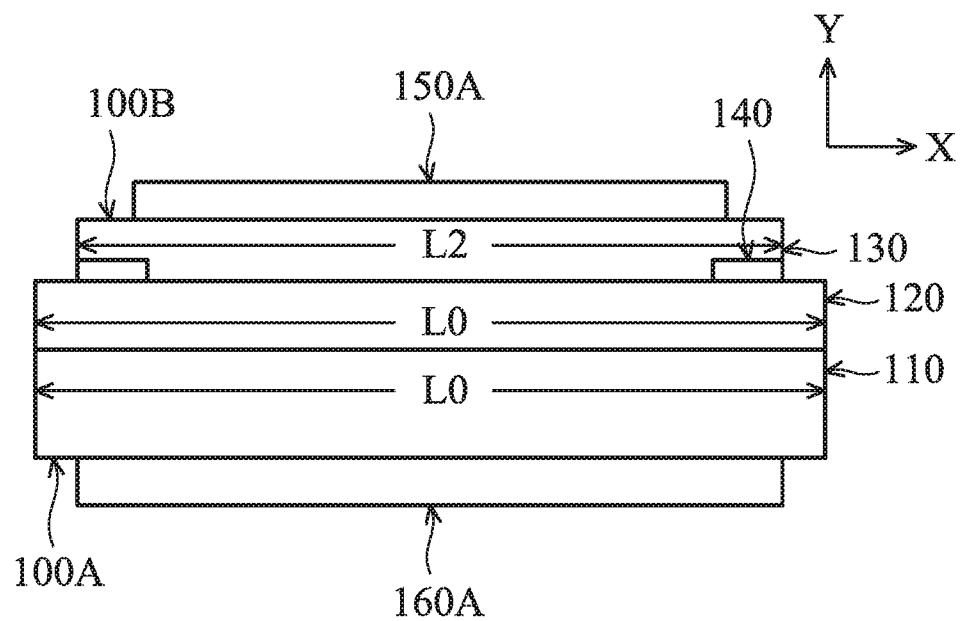

Next, refer to FIG. 2B, in which a first mask 150A is formed on a second surface 100B of the second protective layer 130, and a first photosensitive layer 160A is formed on the first surface 100A of the first protective layer 110. In some embodiments, the first mask 150A partially overlaps the light-shielding layer 140. More specifically, the overlapping portion between first mask 150A and the light-shielding layer 140 forms a ring. As shown in FIG. 2B, the length of the first photosensitive layer 160A is equivalent to the second length L2 of the second protective layer 130, and the first photosensitive layer 160A completely overlaps the second protective layer 130. In some embodiments, the first photosensitive layer 160A is a positive-type photoresist.

Figure 2C:
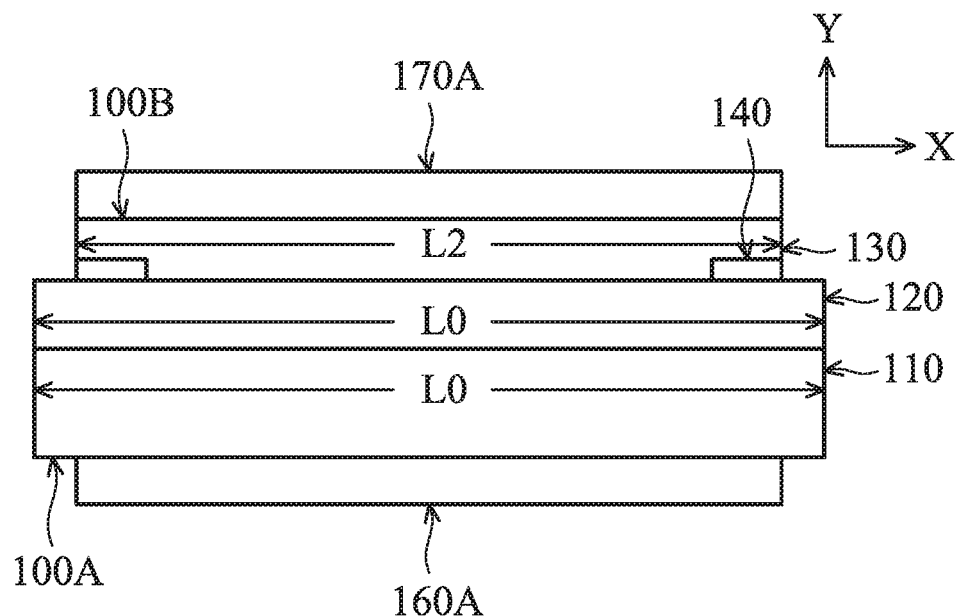

Next, refer to FIG. 2C, wherein after the first photosensitive layer 160A is formed on the first surface 100A of the first protective layer 110, the first mask 150A is removed, and a second photosensitive layer 170A is formed on the second surface 100B of the second protective layer 130. The length of the second photosensitive layer 170A is equivalent to or greater than the second length L2 of the second protective layer 130. In addition, the second photosensitive layer 170A completely overlaps the second protective layer 130 and the first photosensitive layer 160A. In some embodiments, the second photosensitive layer 170A is a positive-type photoresist.

Figure 2D:
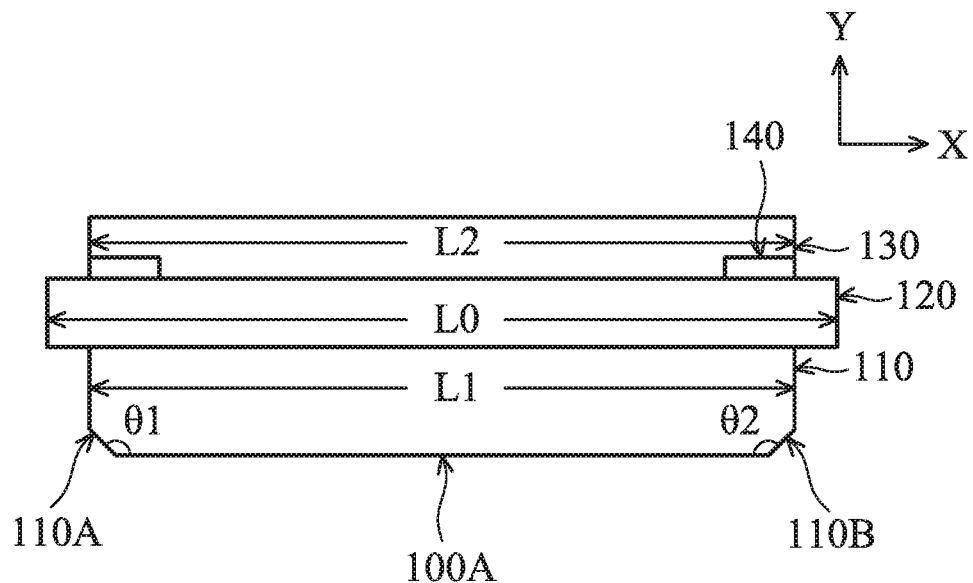

Next, refer to FIG. 2D, wherein after the second photosensitive layer 170A is formed on the second surface 100B of the second protective layer 130, an etching process is performed without performing the developing process. Afterwards, the first photosensitive layer 160A and the second photosensitive layer 170A are removed. As shown in FIG. 2D, after the etching process is performed, a portion of the first protective layer 110 is removed, and therefore the first protective layer 110 has the first length L1 in the first direction. In some embodiments, the first length L1 is substantially equivalent to the second length L2. In some embodiments, the difference between the first length L1 and the second length L2 is between 0 and 1 mm. In addition, after the etching process is performed, a first chamfer portion 110A and a second chamfer portion 110B are formed on the first surface 100A of the first protective layer 110 along a cross-section of the stacking direction of the first protective layer 110, the second adhesion layer 120 and the second protective layer 130. In some embodiments, as shown in FIG. 2D, there are a first angle θ1 between the first chamfer portion 110A and the first surface 100A and a second angle θ2 between the second chamfer portion 110B and the first surface 100A. The first angle θ1 is different from the second angle θ2 due to the variance caused by the etching process on two chamfer portions. Although FIG. 2D only illustrates the first protective layer 110 has the first chamfer portion 110A and the second chamfer portion 110B on the first surface 100A, there are four chamfer portions formed by the etching process on four corners of the first surface 100A of the first protective layer 110. Moreover, the angles constituted by these four chamfer portions and the first surface 100A are different from each other. Namely, the shapes of these four chamfer portions are different from each other.

Figure 2E:
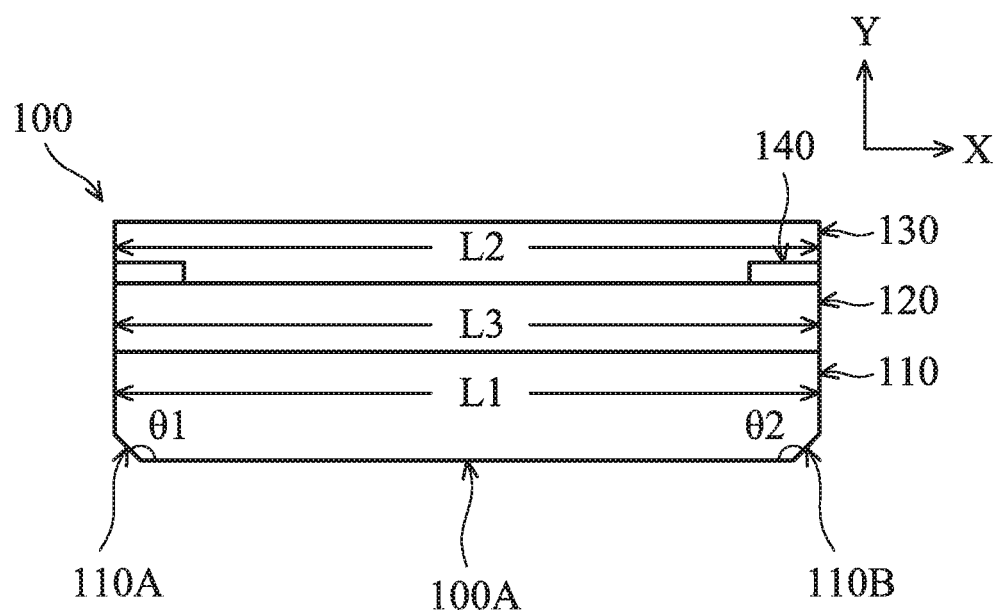

Next, refer to FIG. 2E, wherein after the etching process is performed, a portion of the second adhesion layer 120 is removed. As a result, the second adhesion layer 120 has the third length L3 which is the same as the first length L1 and the second length L2 in the first direction. Afterwards, the protective structure 100 is formed, and the protective structure 100 has a first protective layer 110 and a second protective layer 130 of the same length in the first direction. In addition, the protective structure 100 has a continuous side flat plane composed by the first protective layer 110, the second adhesion layer 120, the second protective layer 130 and the light-shielding layer 140 along the second direction. In some embodiments, the edge difference between the first protective layer 110 and the second protective layer 130 is smaller than 0.1 mm, and this edge difference is defined by the length of the first protective layer 110 exceeding the second protective layer 130 or the second protective layer 130 exceeding the first protective layer 110 in the first direction. Using the process mentioned above to form the protective structure 100 avoids the problem of the edge of the first protective layer 110 and the second protective layer 130 being broken or damaged by the cutting process.

Next, refer to FIGS. 3A-3F, which are cross-sectional views of various stages of a process for forming the protective structure 100 in accordance with some embodiments of the present disclosure. More specifically, FIGS. 3A-3E illustrate that the formation of the protective structure 100 with a first protective layer 110 and a second protective layer 130 of the same length.

Figure 3A:
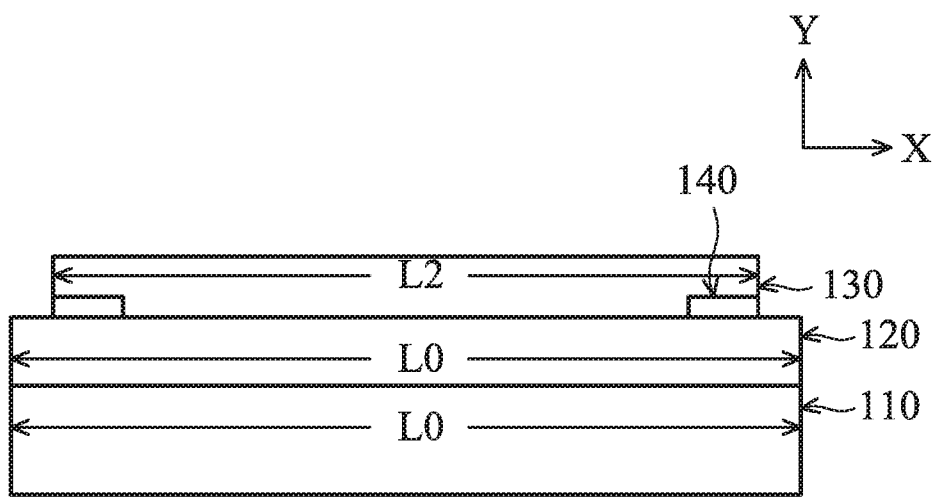
FIGS. 3A-3F are cross-sectional views of various stages of a process for forming a protective structure in accordance with some embodiments of the present disclosure.

At first, as shown in FIG. 3A, the first protective layer 110, the second adhesion layer 120 and the second protective layer 130 are provided. The first protective layer 110 has the original length L0 in the first direction, the second protective layer 130 has the second length L2 in the first direction, and the second adhesion layer 120 has the original length L0 in the first direction which is the same as that of the first protective layer 110. As shown in FIG. 3A, the original length L0 of the first protective layer 110 and the second adhesion layer 120 is greater than the second length L2 of the second protective layer 130. In addition, the light-shielding layer 140 is formed in the second protective layer 130 and located in the peripheral of the second protective layer 130.

Figure 3B:
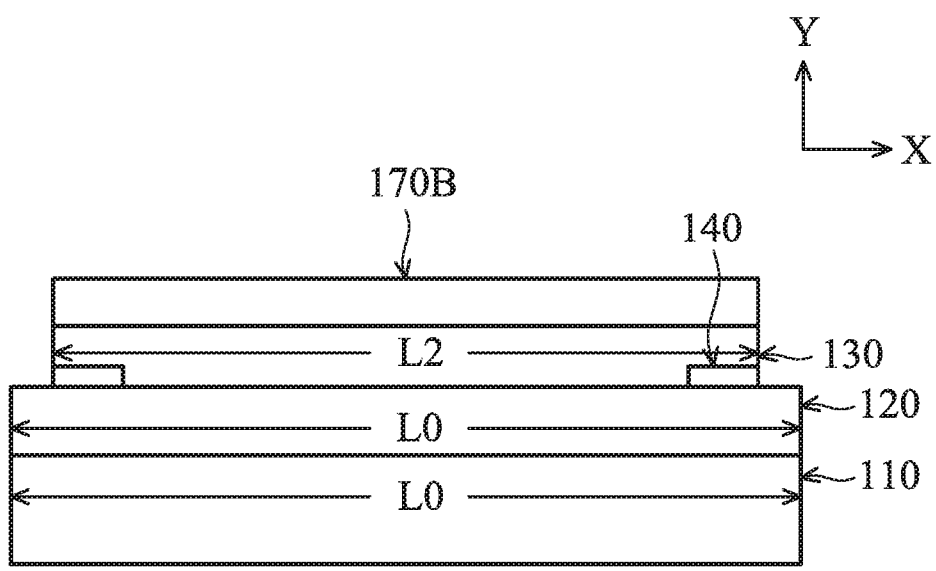

Next, refer to FIG. 3B, in which a second photosensitive layer 170B is formed on the second surface 100B of the second protective layer 130. As shown in FIG. 3B, the length of the second photosensitive layer 170B is equivalent to or greater than the second length L2 of the second protective layer 130, and the second photosensitive layer 170B completely overlaps the second protective layer 130. In some embodiments, the second photosensitive layer 170B is a negative-type photoresist.

Figure 3C:
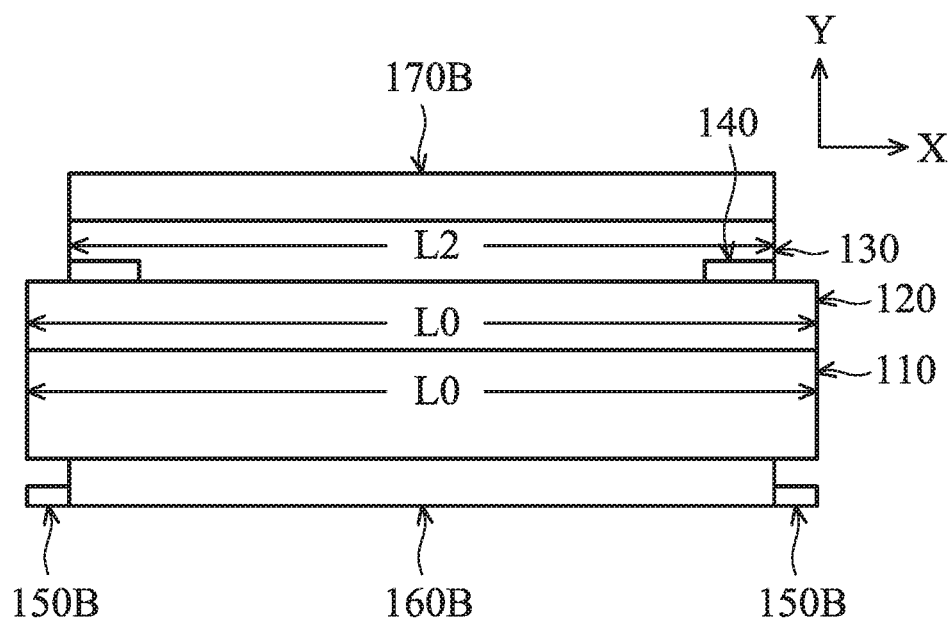

Next, refer to FIG. 3C, wherein after the second photosensitive layer 170B is formed on the second surface 100B of the second protective layer 130, a second mask 150B is formed on the first surface 100A of the first protective layer 110. Afterwards, a first photosensitive layer 160B is formed on the first surface 100A of the first protective layer 110. In some embodiments, the second mask 150B does not overlap the second protective layer 130 and the light-shielding layer 140, and the first photosensitive layer 160B is surrounded by the second mask 150B. More specifically, the second mask 150B is a ring structure surrounding the second protective layer 130 and the first photosensitive layer 160B from a top view. As shown in FIG. 3C, the length of the first photosensitive layer 160B is equivalent to the second length L2 of the second protective layer 130, and the first photosensitive layer 160B completely overlaps the second protective layer 130. In some embodiments, the first photosensitive layer 160B is a negative photoresist.

Figure 3D:
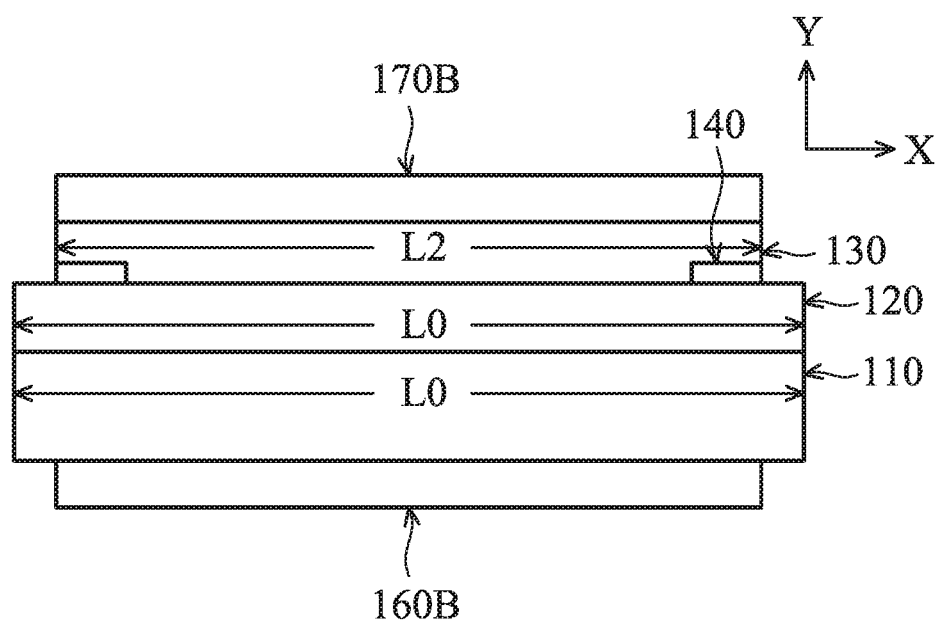

Next, refer to FIG. 3D, wherein after the first photosensitive layer 160B is formed on the first surface 100A of the first protective layer 110, the second mask 150B is removed, and a developing process is performed on the first photosensitive layer 160B and the second photosensitive layer 170B.

Figure 3E:
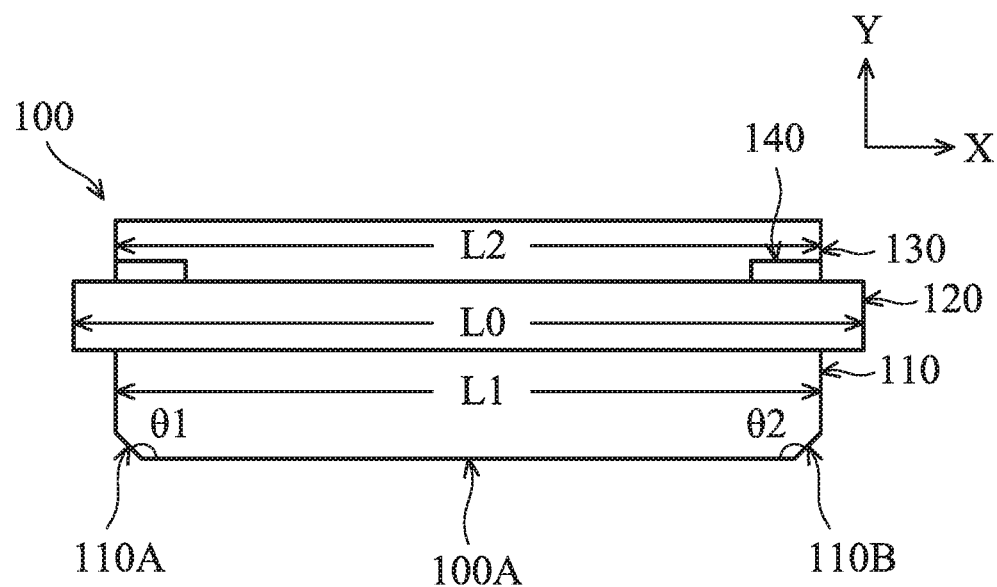

Next, refer to FIG. 3E, wherein after the developing process is performed, an etching process is performed, and the first photosensitive layer 160B and the second photosensitive layer 170B are removed. As shown in FIG. 3E, after the etching process is performed, a portion of the first protective layer 110 is removed, and therefore the first protective layer 110 has the first length L1 in the first direction. In some embodiments, the first length L1 is substantially equivalent to the second length L2. In some embodiments, the difference between the first length L1 and the second length L2 is between 0 and 1 mm. In addition, after the etching process is performed, the first chamfer portion 110A and the second chamfer portion 110B are formed on the first surface 100A of the first protective layer 110 along a cross-section of the stacking direction of the first protective layer 110, the second adhesion layer 120 and the second protective layer 130. In some embodiments, the first angle θ1 between the first chamfer portion 110A and the first surface 100A is different from the second angle θ2 between the second chamfer portion 110B and the first surface 100A. Although FIG. 3E only illustrate the first protective layer 110 has the first chamfer portion 110A and the second chamfer portion 110B on the first surface 100A, there are four chamfer portions formed by the etching process on four corners of the first surface 100A of the first protective layer 110. Moreover, the angles constituted by these four chamfer portions and the first surface 100A are different from each other.

Figure 3F:
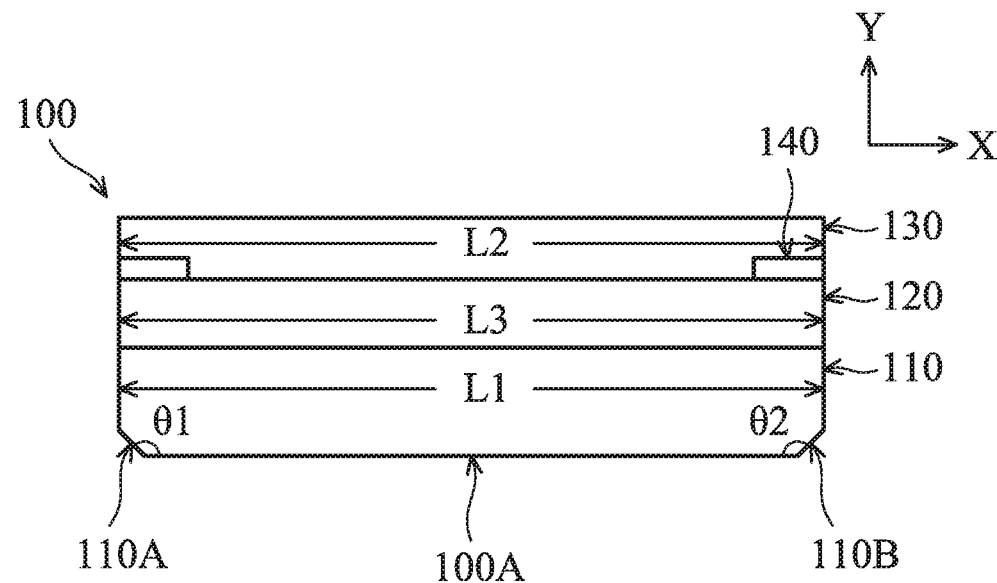

Next, refer to FIG. 3F, wherein after the etching process is performed, a portion of the second adhesion layer 120 is removed. As a result, the second adhesion layer 120 has the third length L3 which is same as the first length L1 and the second length L2 in the first direction. Afterwards, the protective structure 100 is formed, and the protective structure 100 has a first protective layer 110 and a second protective layer 130 of the same length in the first direction. In addition, the protective structure 100 has a continuous side flat plane composed by the first protective layer 110, the second adhesion layer 120, the second protective layer 130 and the light-shielding layer 140 along the second direction. In some embodiments, the edge difference between the first protective layer 110 and the second protective layer 130 is smaller than 0.1 mm, and this edge difference may be defined by the length of the first protective layer 110 exceeding the second protective layer 130 or the second protective layer 130 exceeding the first protective layer 110 in the first direction. Using the process mentioned above to form the protective structure 100 avoids the problem of the edge of the first protective layer 110 and the second protective layer 130 being broken or damaged by the cutting process.

Figure 4A:
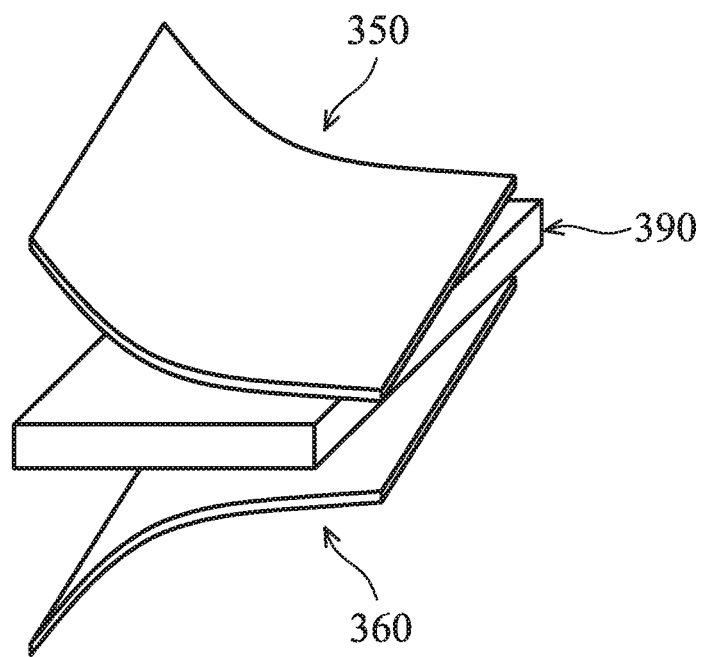
FIGS. 4A-4B are views of various stages of a process for attaching a polarizing film to a display element layer in accordance with some embodiments of the present disclosure.
Figure 4B:
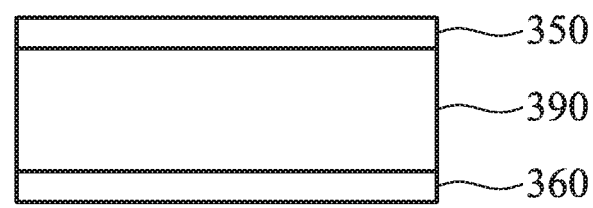
Figure 5:
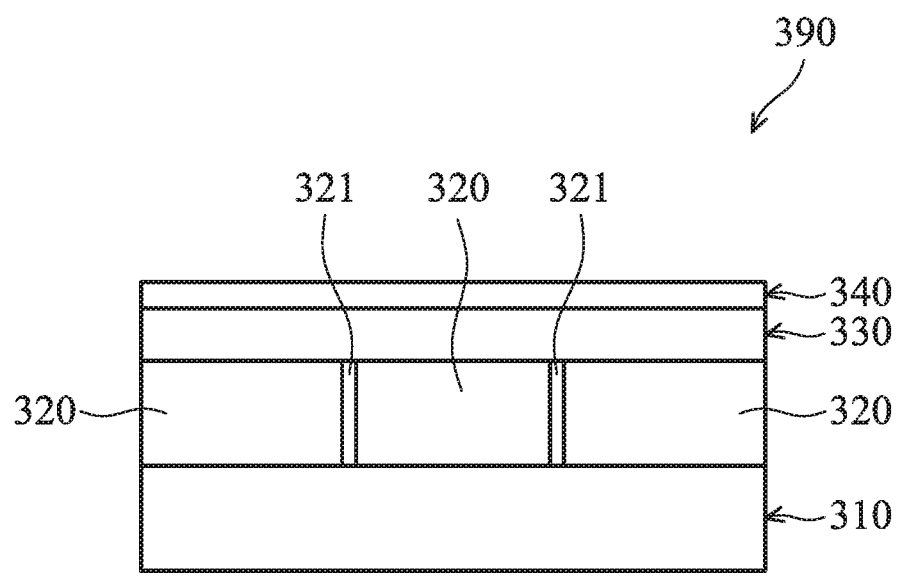
FIG. 5 is a cross-sectional view of a display element layer in accordance with some embodiments of the present disclosure.

Next, referring to FIGS. 4A, 4B and 5, FIGS. 4A-4B are views of a process for attaching a first polarizing film 350 and a second polarizing film 360 to a display element layer 390 in accordance with some embodiments of the present disclosure, and FIG. 5 is a cross-sectional view of a display element layer 390 in accordance with some embodiments of the present disclosure. The display element layer 390 may be used as a bulk substrate for forming a display unit 300. The display element layer 390 includes a first substrate 310, a light filter film 330 and a second substrate 340. The display element layer 390 includes a liquid-crystal layer 320 disposed between the light filter film 330 and the first substrate 310. The display element layer 390 also further includes a scribe line 321 between the light filter film 330 and the first substrate 310. As shown in FIG. 5, the scribe line 321 separates two neighboring liquid-crystal layers 320.

Turning back to FIGS. 4A and 4B, FIG. 4A illustrates that the first polarizing film 350 and the second polarizing film 360 are attached to the uncut display element layer 390, and the structure shown in FIG. 4B is formed. The first polarizing film 350 and the second polarizing film 360 may be attached to two sides of the display element layer 390 simultaneously. Alternatively, the first polarizing film 350 may be attached to the display element layer 390 before the second polarizing film 360 is attached to the display element layer 390. Alternatively, the second polarizing film 360 may be attached to the display element layer 390 before the first polarizing film 350 is attached to the display element layer 390. In the structure shown in FIG. 4B, the display element layer 390 includes the scribe line 321 and the multiple liquid-crystal layers 320 separated by the scribe line 321. The scribe line 321 may be designed to have the desired shape, which may be a rectangle or another non-rectangular shape such as a circle, an oval, a triangle, or a hexagon, or it may be another, irregular shape, but it is not limited thereto.

Next, refer to FIGS. 6A-6E, which are cross-sectional views of various stages of a process for forming the display unit in accordance with some embodiments of the present disclosure. More specifically, FIGS. 6A-6E illustrate the process of cutting the structure including the first polarizing film 350, the second polarizing film 360 and the display element layer 390 as shown in FIG. 4B so as to form isolated the display unit 300.

Figure 6A:
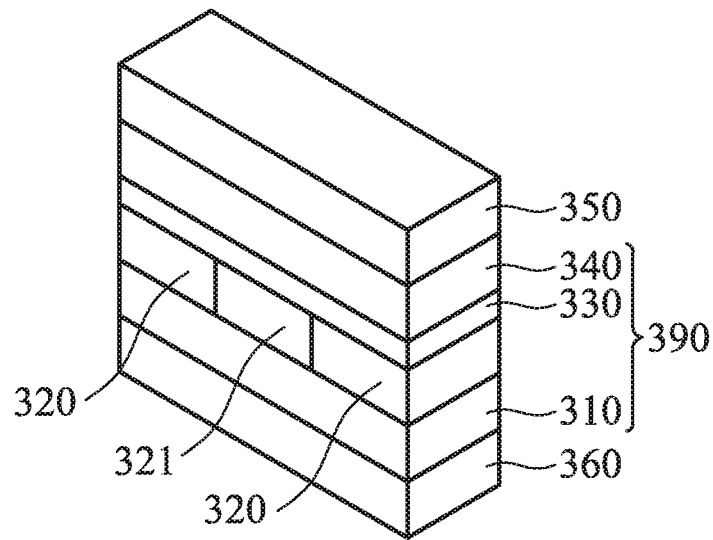
FIGS. 6A-6E are cross-sectional views of various stages of a process for forming a display device in accordance with some embodiments of the present disclosure.

At first, in reference to FIG. 6A, the bulk structure including the first polarizing film 350, the second polarizing film 360 and the display element layer 390 is provided. The first polarizing film 350 and the second polarizing film 360 are disposed on two opposite sides of the display element layer 390, and the display element layer 390 includes the scribe line 321 and the multiple liquid-crystal layers 320 separated by the scribe line 321.

Figure 6B:
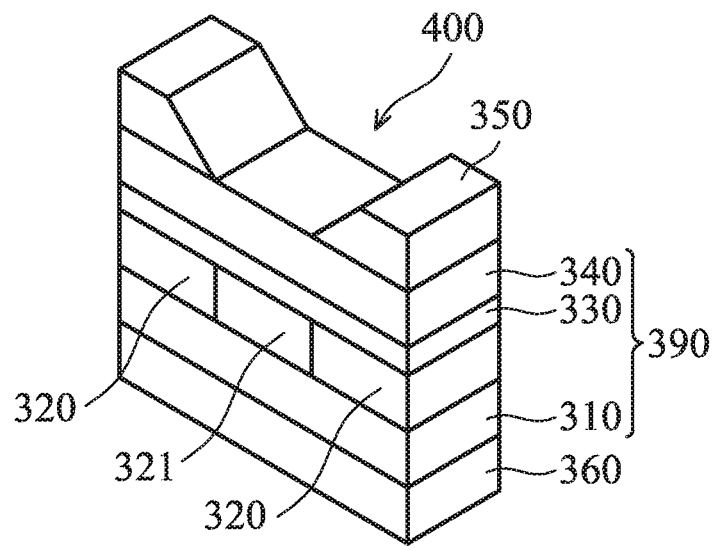

Next, in reference to FIG. 6B, in some embodiments, a first laser 400 is used to remove a portion of the first polarizing film 350. As shown in FIG. 6B, the portion of the first polarizing film 350 removed by the first laser 400 is corresponding to where the scribe line 321 is disposed. In this step, the display element layer 390 is not cut. Namely, the first laser 400 only removes the portion of first polarizing film 350, and does not remove the second substrate 340. The selection of the first laser 400 may be according to the material of the first polarizing film 350 and the second polarizing film 360. For example, the ultraviolet is used as the first laser 400 to remove the first polarizing film 350.

Figure 6C:
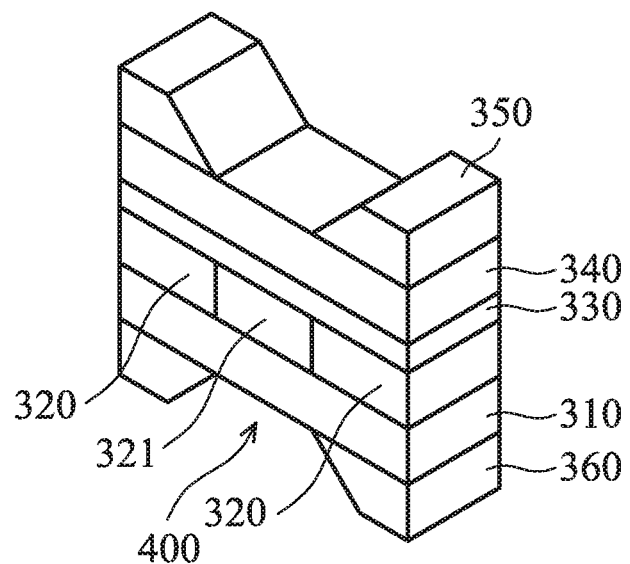

Next, with reference to FIG. 6C, after the portion of the first polarizing film 350 corresponding to where the scribe line 321 is disposed is removed, the first laser 400 is used to remove a portion of the second polarizing film 360. As shown in FIG. 6C, the portion of the second polarizing film 360 removed by the first laser 400 is corresponding to where the scribe line 321 is disposed. In this step, the display element layer 390 is not cut. Namely, the first laser 400 only removes the portion of second polarizing film 360, and does not remove the first substrate 310. In this embodiment, the same laser (such as the first laser 400) is used to remove the first polarizing film 350 and the second polarizing film 360. In other embodiments, it may use different lasers to remove the first polarizing film 350 and the second polarizing film 360. In addition, the second polarizing film 360 may be removed, followed by the first polarizing film 350 being removed.

Figure 6D:
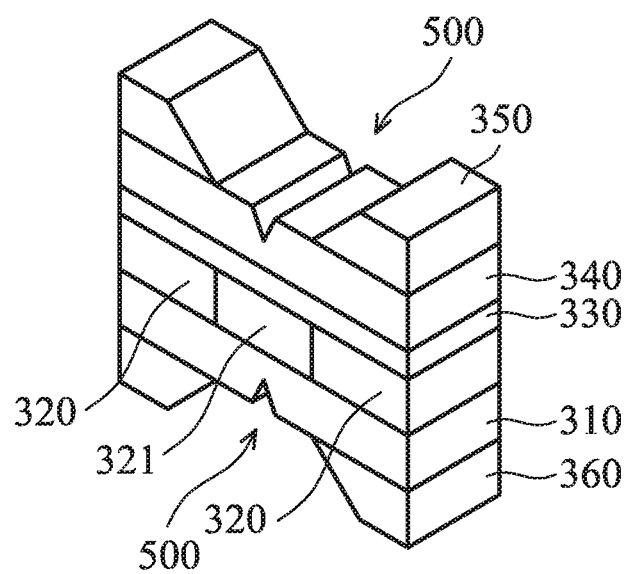
Figure 6E:
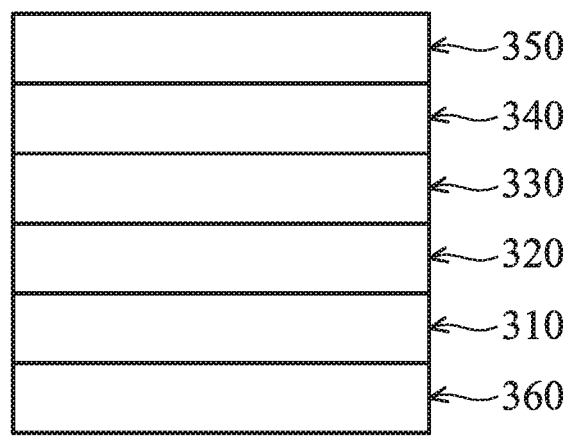

Next, with reference to FIG. 6D, after the portion of the first polarizing film 350 and the second polarizing film 360 corresponding to where the scribe line 321 is disposed are removed, a portion of the first substrate 310 and the second substrate 340 are removed. In some embodiments, a second laser 500 is used to remove the first substrate 310 and the second substrate 340. The selection of the second laser 500 may be according to the material of the first substrate 310 and the second substrate 340. For example, the infrared is used as the second laser 500 to cut the first substrate 310 and the second substrate 340 along the scribe line 321. In addition, in some embodiments, a cutting tool is used to remove the portion of the first substrate 310 and the second substrate 340. In this step, the first substrate 310 and the second substrate 340 may not be completely cut through. Namely, the scribe line 321 is still completely covered by the first substrate 310 and the second substrate 340.

Next, after the portion of the first substrate 310 and the second substrate 340 corresponding to where the scribe line 321 is disposed are removed, the remaining portion of the display element layer 390 is broken by a method such as baking, and the multiple isolated display units 300 are formed. Using the method described in the embodiments of the present disclosure, some steps such as scribing, breaking, grinding and cleaning can be omitted. In addition, the yield of the display unit 300 is also improved by attaching the first polarizing film 350 and the second polarizing film 360 to the display element layer 390 first, and then cutting to form the isolated display unit 300.

Refer to FIGS. 7A-7D, which are cross-sectional views of various stages of a process for attaching the protective structure 100 to the display unit 300 in accordance with some embodiments of the present disclosure. It should be appreciated that the embodiments shown in FIGS. 7A-7D can not only be applied in attaching the protective structure 100 and the display unit 300 of the embodiments of the present disclosure, but also in other display devices having a curved structure.

Figure 7A:
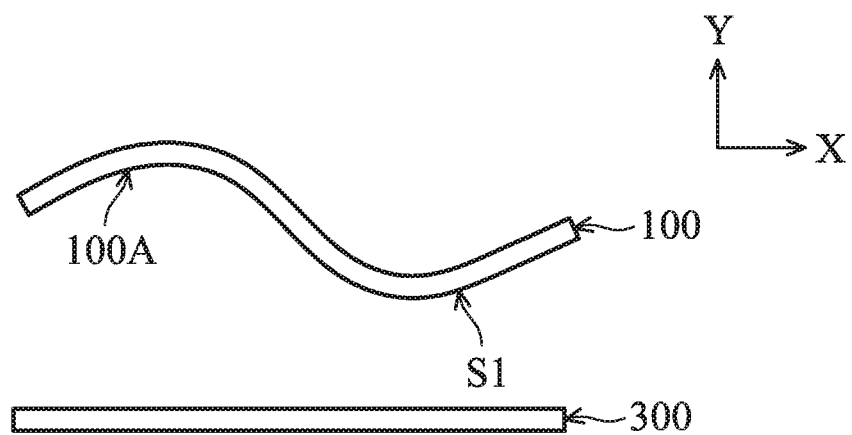
FIGS. 7A-7D are cross-sectional views of various stages of a process for attaching a protective structure to a display device in accordance with some embodiments of the present disclosure.
Figure 7B:
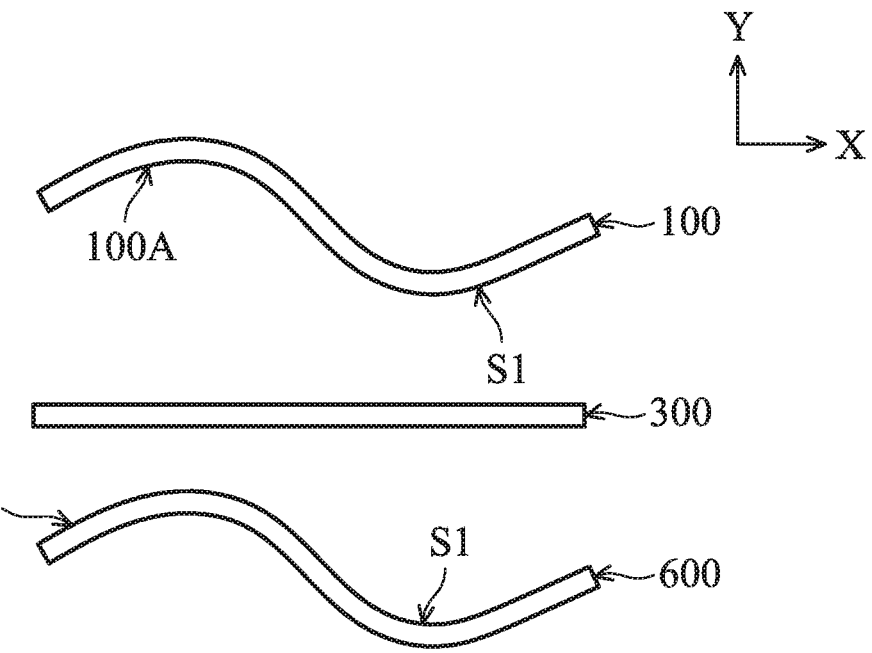
Figure 7C:
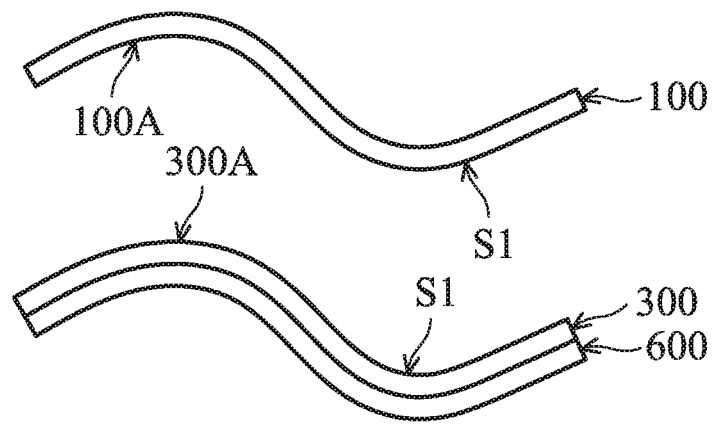

At first, with reference to FIG. 7A, the protective structure 100 and the display unit 300 are provided. As shown in FIG. 7A, the first surface 100A of the protective structure 100 has an original first shape S1 along the cross-section such as the X direction or Y direction. The first shape S1 may be formed in a single or multiple staggered way of convex part, convex point, concave part or concave point. The exterior of the first shape S1 may be seen as a ~ shape, a υ shape, ω shape, Ω shape, v shape, σ shape or o shape in a cross section. There is a highest point in the partial area such as a ridge point or a top point, and a lowest point in the partial area such as a saddle point or a concave point. Next, with reference to FIGS. 7B and 7C, in some embodiments, before the protective structure 100 is attached to the display unit 300, a carrier substrate 600 is provided, and the display unit 300 is attached to the carrier substrate 600. As shown in FIG. 7B, the surface 600A of the carrier substrate 600 has the shape same as the first shape S1 of the first surface 100A of the protective structure 100. As shown in FIG. 7C, after the display unit 300 is attached to the carrier substrate 600, a third surface 300A of the display unit 300 also has the shape same as the first shape S1 of the first surface 100A of the protective structure 100.

The carrier substrate 600 may be formed of glass, a polymer such as polyimide (PI), plastic, rubber, metal, or a ceramic material, but it is not limited thereto. The process of attaching the display unit 300 to the carrier substrate 600 may be vacuum adsorption, electrostatic adsorption, gluing, or another process of physical or chemical bonding, but it is not limited thereto.

Figure 7D:
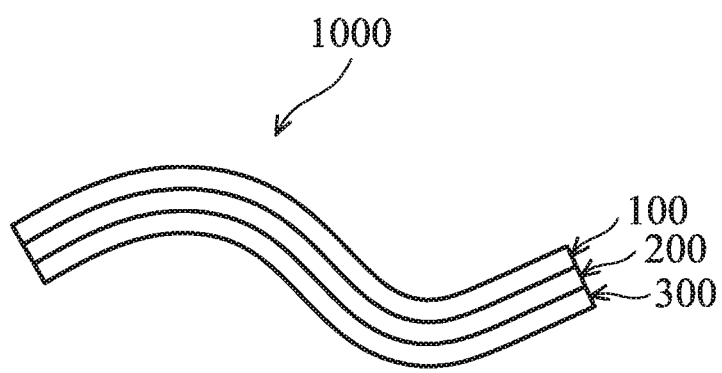

Next, in reference to FIG. 7D, the third surface 300A with the first shape S1 of the display unit 300 is attached to the first surface 100A with the first shape S1 of the protective structure 100 through the first adhesion layer 200, and the carrier substrate 600 is removed. Afterwards, the display device 1000 is formed. The attachment process may be formed by roll-to-roll (R2R) processing or exerting pressure on the display unit 300 so that the display unit 300 may be attached conformally to the shape of the protective structure 100.

In this embodiment, the attaching surface (e.g. the third surface 300A) of the display unit 300 has the same shape as the protective structure 100. Therefore, it prevents bubbles or gaps from forming in the interface between the display unit 300 and the protective structure 100.

Figure 8A:
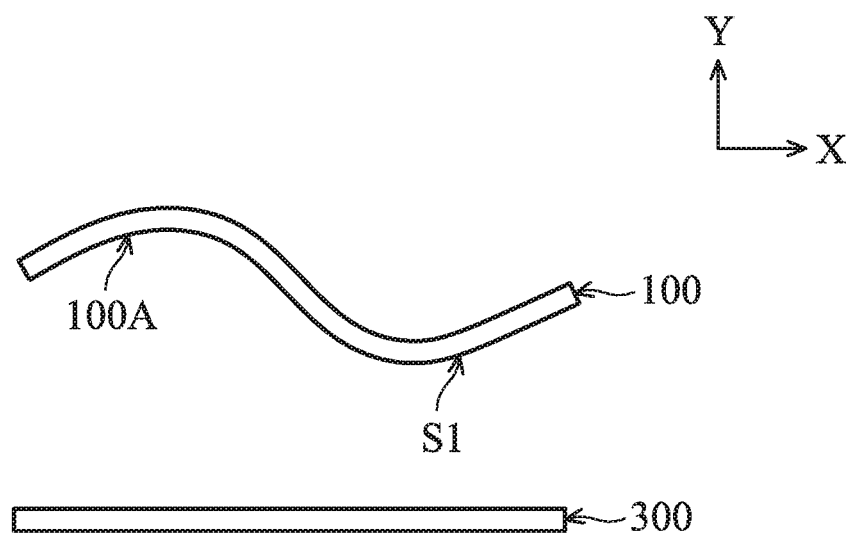
FIGS. 8A-8C are cross-sectional views of various stages of a process for attaching a protective structure to a display device in accordance with some embodiments of the present disclosure.
Figure 8B:
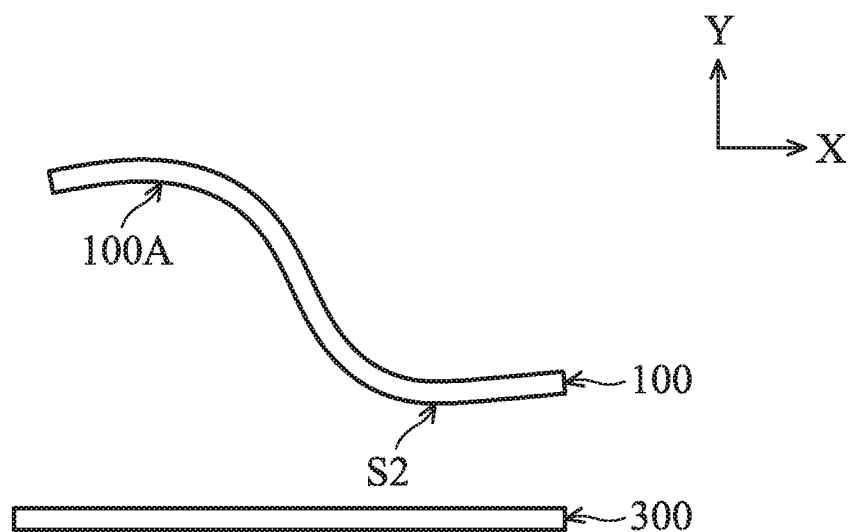
Figure 8C:
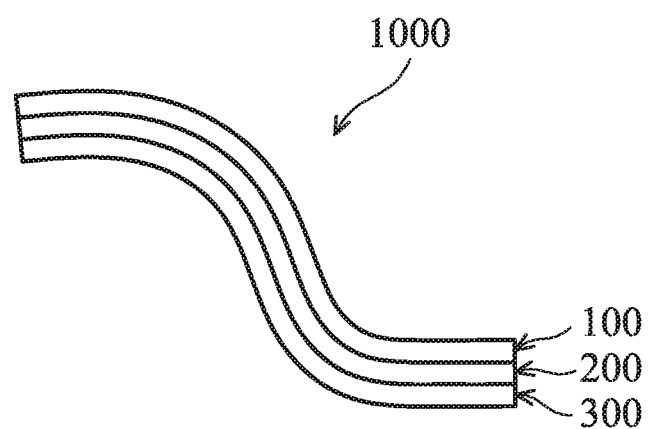

Refer to FIGS. 8A-8C, which are cross-sectional views of various stages of a process for attaching the protective structure 100 to the display unit 300 in accordance with some embodiments of the present disclosure. It should be appreciated that the embodiments shown in FIGS. 8A-8C can not only be applied in attaching the protective structure 100 and the display unit 300 of the embodiments of the present disclosure, but also in other display devices having a curved structure.

At first, with reference to FIG. 8A, the protective structure 100 and the display unit 300 are provided. As shown in FIG. 8A, the first surface 100A of the protective structure 100 has an original first shape S1 along the cross-section such as the X direction or Y direction.

Next, with reference to FIG. 8B, in some embodiments, before attaching the protective structure 100 to the display unit 300, the protective structure 100 is rotated (or bent) so that the first surface 100A has a second shape S2 that is different from the first shape S1. In some embodiments, the second shape S2 does not have a convex and/or a concave point, and the position of the second direction (such as the Y coordinate) of the protective structure 100 decreases or increases progressively along the first direction (e.g. X direction). More specifically, there is only one intersection between the protective structure 100 having the second shape S2 and any cross-section line parallel to the first direction.

Next, with reference to FIG. 8C, the display unit 300 is attached to the first surface 100A with the second shape S2 of the protective structure 100 through the first adhesion layer 200, and the display device 1000 is formed. In this embodiment, since the display unit 300 does not have convex or concave substantially, it prevents bubbles or gaps from forming in the interface between the display unit 300 and the protective structure 100 during the attachment process.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A display device having a display region and a peripheral region surrounding the display region, wherein the display device comprises:
   a display unit:
   a first adhesion layer disposed on the display unit; and
   a protective structure disposed on the first adhesion layer, wherein the protective structure comprises:
   a first protective layer having a first length in a first direction;
   a second adhesion layer disposed on the first protective layer; and
   a second protective layer disposed on the second adhesion layer, and the second protective layer has a second length in the first direction, wherein a difference between the first length and the second length is between 0 and 1 mm, and wherein the second protective layer is on the outermost side of the display device, wherein the protective structure has a first surface adjacent to the display unit, and wherein in a cross-section along a stack direction of the protective structure, the first protective layer has a first chamfer portion and a second chamfer portion on the first surface, and an angle between the first chamfer portion and the first surface is different from an angle between the second chamfer portion and the first surface.

2. The display device as claimed in claim 1, wherein the display unit comprises:
   a liquid-crystal layer disposed on a first substrate; and
   a first polarizing film disposed on the first liquid-crystal layer, wherein the first polarizing film is adjacent to the first surface of the protective structure.

3. The display device as claimed in claim 1, wherein the first protective layer has a first thickness in a second direction perpendicular to the first direction, the second protective layer has a second thickness in the second direction, the first thickness is greater than the second thickness, and the second thickness is smaller than or equivalent to 0.2 mm, and greater than 0.

4. The display device as claimed in claim 1, wherein the protective structure further comprises:
   a light-shielding layer disposed in the second protective layer and in the peripheral region of the display device, wherein the first protective layer, the second adhesion layer, the second protective layer and the light-shielding layer have a continuous flat surface in a second direction perpendicular to the first direction.

5. The display device as claimed in claim 1, wherein the second adhesion layer has a third length in the first direction, wherein the first length is equivalent to the second length, and equivalent to the third length.

6. A display device having a display region and a peripheral region surrounding the display region, wherein the display device comprises:
   a display unit:
   a first adhesion layer disposed on the display unit; and
   a protective structure disposed on the first adhesion layer, wherein the protective structure comprises:
   a first protective layer having a first length in a first direction;
   a second adhesion layer disposed on the first protective layer; and
   a second protective layer disposed on the second adhesion layer, and the second protective layer has a second length in the first direction, wherein a difference between the first length and the second length is between 0 and 1 mm, and wherein the second protective layer is on the outermost side of the display device, wherein the first protective layer has a first thickness in a second direction perpendicular to the first direction, the second protective layer has a second thickness in the second direction, the first thickness is greater than the second thickness, and the second thickness is smaller than or equivalent to 0.2 mm, and greater than 0.

7. The display device as claimed in claim 6, wherein the protective structure has a first surface adjacent to the display unit, and wherein in a cross-section along a stack direction of the protective structure, the first protective layer has a first chamfer portion and a second chamfer portion on the first surface, and an angle between the first chamfer portion and the first surface is different from an angle between the second chamfer portion and the first surface.

8. The display device as claimed in claim 7, wherein the display unit comprises:
 a liquid-crystal layer disposed on a first substrate; and
 a first polarizing film disposed on the first liquid-crystal layer, wherein the first polarizing film is adjacent to the first surface of the protective structure.

9. The display device as claimed in claim 6, wherein the protective structure further comprises:
 a light-shielding layer disposed in the second protective layer and in the peripheral region of the display device, wherein the first protective layer, the second adhesion layer, the second protective layer and the light-shielding layer have a continuous flat surface in a second direction perpendicular to the first direction.

10. The display device as claimed in claim 6, wherein the second adhesion layer has a third length in the first direction, wherein the first length is equivalent to the second length, and equivalent to the third length.

11. A display device having a display region and a peripheral region surrounding the display region, wherein the display device comprises:
 a display unit:
 a first adhesion layer disposed on the display unit; and
 a protective structure disposed on the first adhesion layer, wherein the protective structure comprises:
  a first protective layer having a first length in a first direction;
  a second adhesion layer disposed on the first protective layer;
  a second protective layer disposed on the second adhesion layer, and the second protective layer has a second length in the first direction, wherein a difference between the first length and the second length is between 0 and 1 mm, and wherein the second protective layer is on the outermost side of the display device; and
  a light-shielding layer disposed in the second protective layer and in the peripheral region of the display device, wherein the first protective layer, the second adhesion layer, the second protective layer and the light-shielding layer have a continuous flat surface in a second direction perpendicular to the first direction.

12. The display device as claimed in claim 11, wherein the protective structure has a first surface adjacent to the display unit, and wherein in a cross-section along a stack direction of the protective structure, the first protective layer has a first chamfer portion and a second chamfer portion on the first surface, and an angle between the first chamfer portion and the first surface is different from an angle between the second chamfer portion and the first surface.

13. The display device as claimed in claim 12, wherein the display unit comprises:
 a liquid-crystal layer disposed on a first substrate; and
 a first polarizing film disposed on the first liquid-crystal layer, wherein the first polarizing film is adjacent to the first surface of the protective structure.

14. The display device as claimed in claim 11, wherein the first protective layer has a first thickness in a second direction perpendicular to the first direction, the second protective layer has a second thickness in the second direction, the first thickness is greater than the second thickness, and the second thickness is smaller than or equivalent to 0.2 mm, and greater than 0.

15. The display device as claimed in claim 11, wherein the second adhesion layer has a third length in the first direction, wherein the first length is equivalent to the second length, and equivalent to the third length.

* * * * *